United States Patent [19]

Katsumata et al.

[11] Patent Number: 5,276,515
[45] Date of Patent: Jan. 4, 1994

[54] COMPATIBLE WIDE ASPECT RATIO RECEIVER WITH SPATIAL FILTERING FOR VARIABLE ZOOM

[75] Inventors: Kenji Katsumata; Shigeru Hirahata, both of Yokohama; Haruki Takata, Chigasaki; Mituo Konno, Yokohama; Kouichi Ishibashi, Chigasaki; Kazuhiro Kaizaki; Takaaki Matono, both of Yokohama; Atushi Haratani, Urayasu, all of Japan

[73] Assignees: Hitachi, Ltd., Tokyo; Hitachi Video & Information System, Inc., Kanagawa, both of Japan

[21] Appl. No.: 942,143

[22] Filed: Sep. 8, 1992

[30] Foreign Application Priority Data

Sep. 26, 1991 [JP] Japan .................. 3-247292

[51] Int. Cl.[5] ............................................. H04N 5/46
[52] U.S. Cl. .................................... 358/160; 358/180
[58] Field of Search ............... 358/140, 180, 166, 160;
H04N 7/01, 5/46

[56] References Cited

U.S. PATENT DOCUMENTS

| | | | |
|---|---|---|---|
| 4,496,974 | 1/1985 | Heitmann | 358/140 |
| 4,729,012 | 3/1988 | Jose et al. | 358/180 X |
| 5,016,103 | 5/1991 | Rabii | 358/166 |
| 5,029,006 | 7/1991 | Katsumata et al. | 358/180 |
| 5,084,765 | 1/1992 | Morita et al. | 358/180 X |
| 5,089,893 | 2/1992 | Iwase | 358/180 |
| 5,119,193 | 6/1992 | Noji | 358/166 |
| 5,134,479 | 7/1992 | Ohishi | 358/140 |
| 5,170,256 | 12/1992 | Tabata | 358/180 X |
| 5,191,417 | 3/1993 | Skinner et al. | 358/140 X |

FOREIGN PATENT DOCUMENTS

| | | | |
|---|---|---|---|
| 3-60583 | 7/1989 | Japan | H04N 5/46 |
| 3-11891 | 1/1991 | Japan | H04N 7/01 |

*Primary Examiner*—Mark R. Powell
*Attorney, Agent, or Firm*—Antonelli, Terry, Stout & Kraus

[57] ABSTRACT

A video signal processing circuit is provided to display an image of a standard television signal on a display unit with a 6:9 aspect ratio by enlarging an image of a video signal in the horizontal and vertical directions by a magnification factor which depends on the feature of the standard television signal. The processing circuit includes a first memory circuit which reads out the stored video signal in response to a read clock different from the write clock and generated by a stable frequency source so that the image of the video signal is expanded in the vertical direction, a second memory circuit which implements time-base compression for the output of the first memory circuit and thereafter expands the signal, a spatial filter which implements filtering for the output of the second memory circuit, an enlargement control circuit which control the above-mentioned circuits, and a synchronizing processing circuit. The circuit arrangement enables video signals of various image sizes, such as for movie pictures, to be displayed by signal conversion on a display unit with a 16:9 aspect ratio, and is capable of suppressing jitters of video signals.

15 Claims, 15 Drawing Sheets

F I G. 1
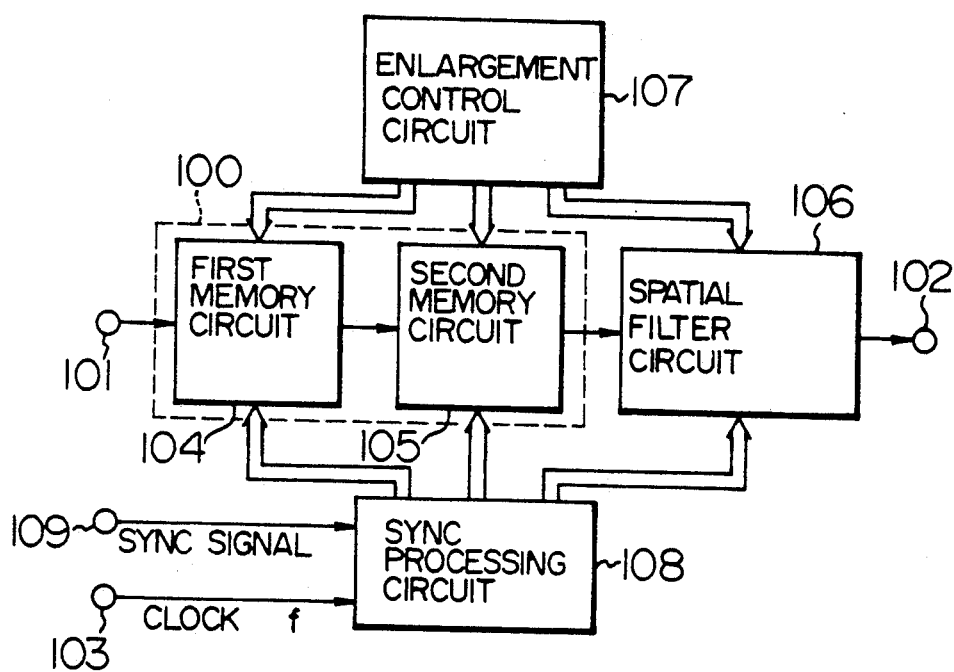

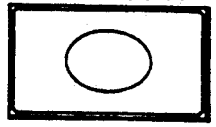
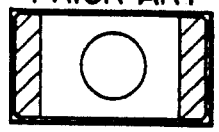
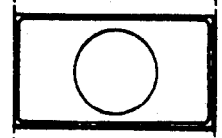
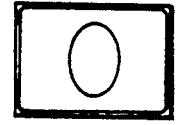
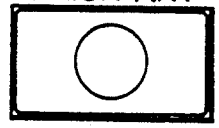
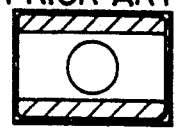
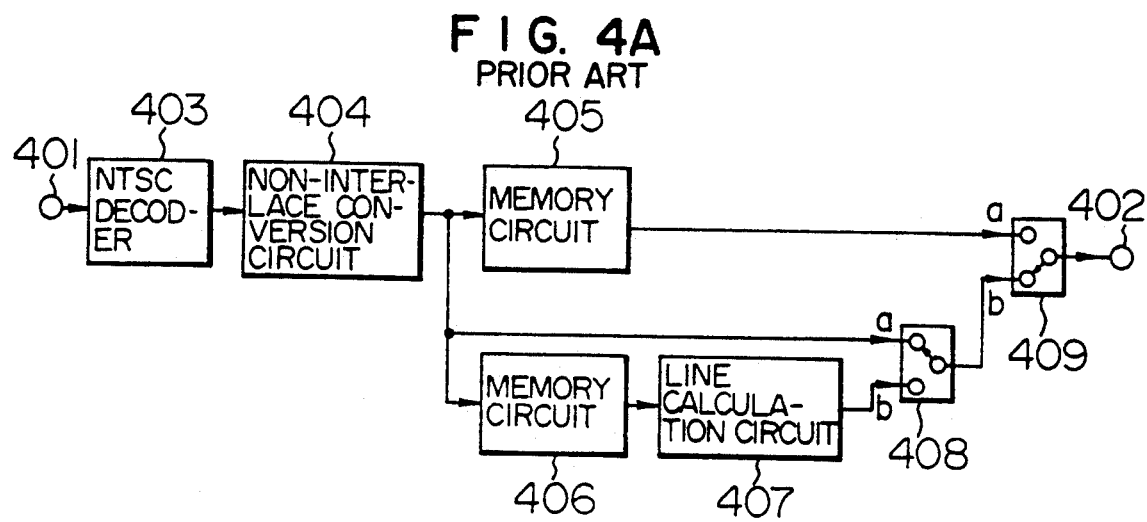
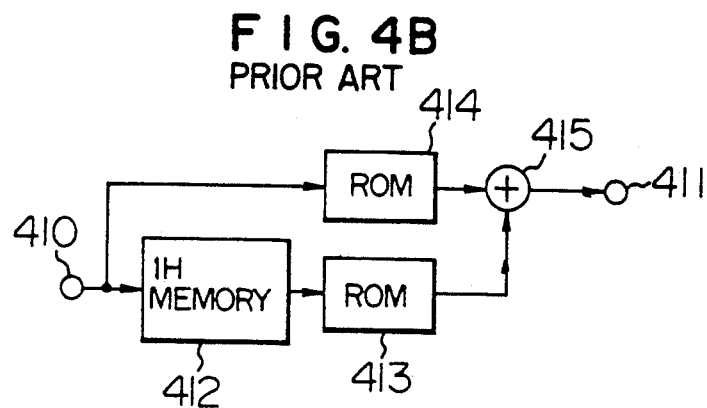

FIG. 5
PRIOR ART

| (A) (B) | (C) | (D) | (E) | (F) | (G) |
|---|---|---|---|---|---|
| | ⓐ | 1/4 | ⓩ | 3/4 | $\frac{1}{4} \cdot a + \frac{3}{4} \cdot z$ |
| | ⓐ | 0 | ⓐ | 1 | $0 \cdot a + 1 \cdot a$ |
| | ⓑ | 3/4 | ⓐ | 1/4 | $\frac{3}{4} \cdot b + \frac{1}{4} \cdot a$ |
| | ⓒ | 1/2 | ⓑ | 1/2 | $\frac{1}{2} \cdot c + \frac{1}{2} \cdot b$ |
| | ⓓ | 1/4 | ⓒ | 3/4 | $\frac{1}{4} \cdot d + \frac{3}{4} \cdot c$ |
| | ⓓ | 0 | ⓓ | 1 | $0 \cdot d + 1 \cdot d$ |
| | ⓔ | 3/4 | ⓓ | 1/4 | $\frac{3}{4} \cdot e + \frac{1}{4} \cdot d$ |
| | ⓕ | 1/2 | ⓔ | 1/2 | $\frac{1}{2} \cdot f + \frac{1}{2} \cdot e$ |
| | ⓖ | 1/4 | ⓕ | 3/4 | $\frac{1}{4} \cdot g + \frac{3}{4} \cdot f$ |
| | ⓖ | 0 | ⓖ | 1 | $0 \cdot g + 1 \cdot g$ |

FIG. 8
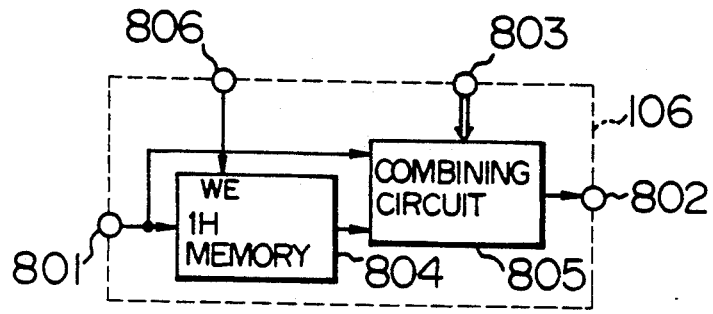
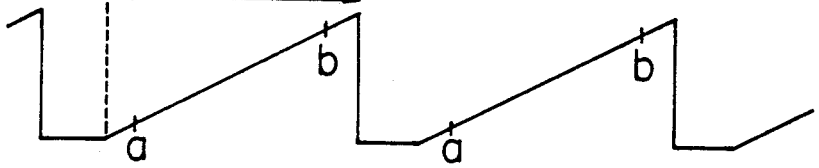
FIG. 9A
FIG. 9B
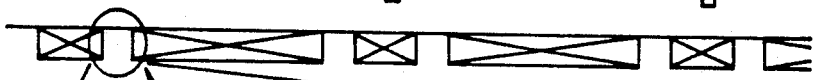
FIG. 9C
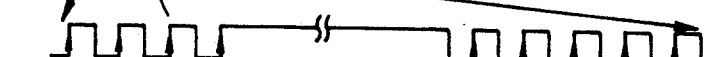
FIG. 9D
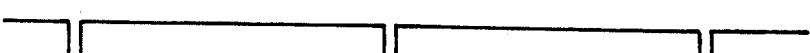
FIG. 9E
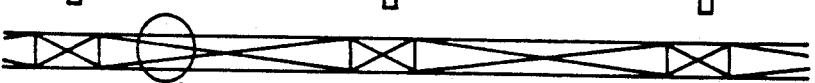
FIG. 9F
FIG. 9G
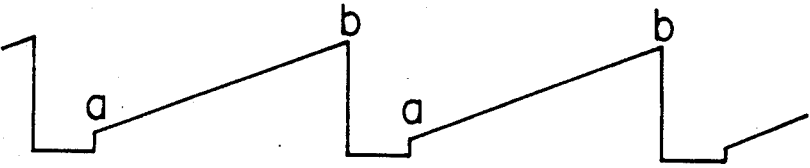
FIG. 9H

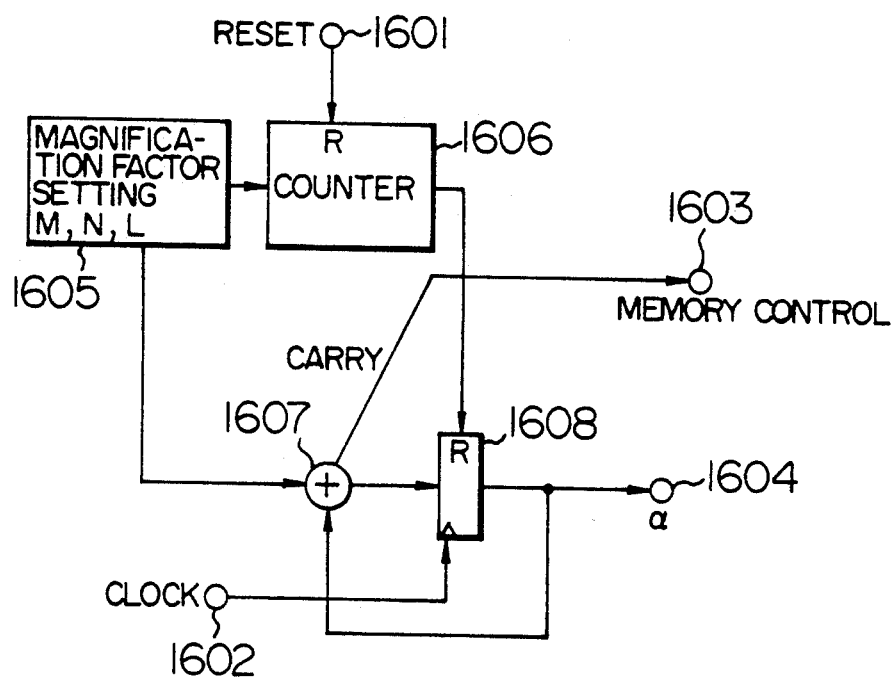
F I G. 16

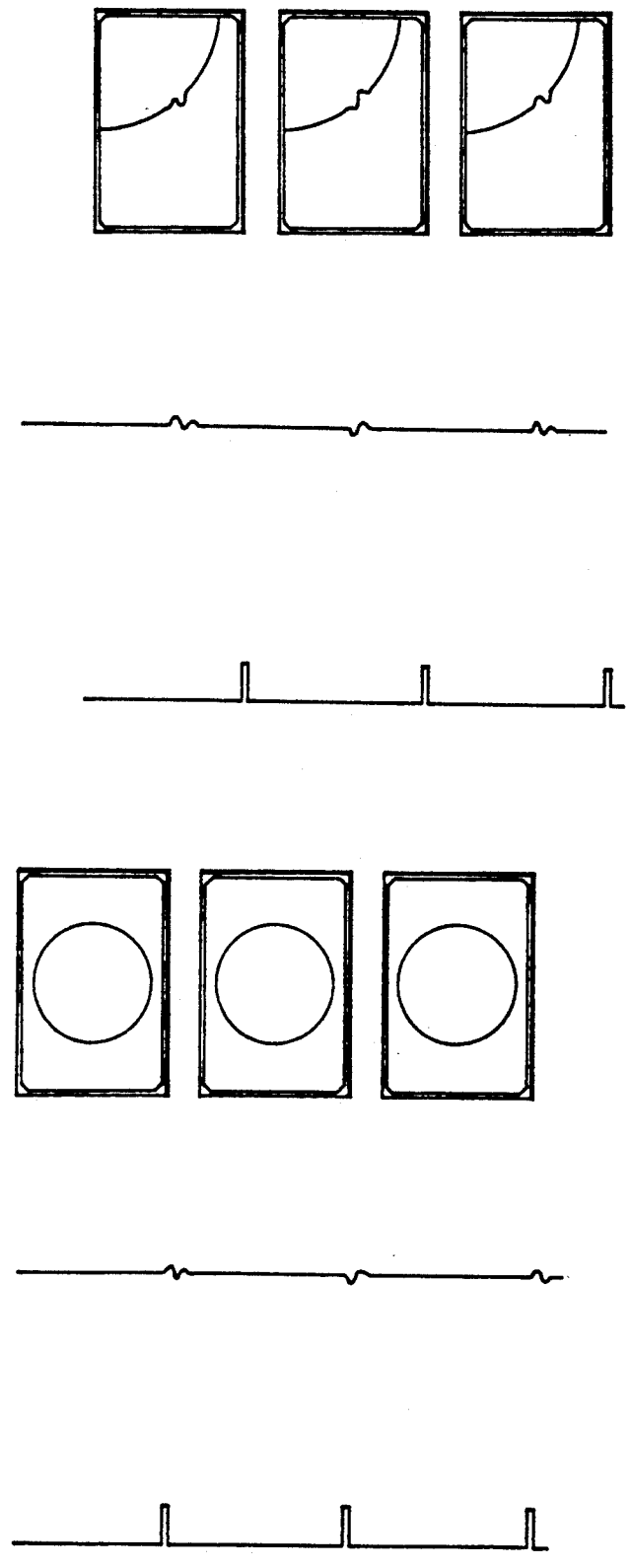

COMPATIBLE WIDE ASPECT RATIO RECEIVER WITH SPATIAL FILTERING FOR VARIABLE ZOOM

CROSS-REFERENCE TO RELATED APPLICATION

This application relates to an application U.S. Ser. No. 07/634,518 filed Dec. 27, 1990, now U.S. Pat. No. 5,181,110 entitled "Video Signal Processing Capable of Enlarging and Displaying a Picture by Kenji Katsumata, Shigeru Hirahata, Masao Sugiyama, Takaaki Matono, Kazuo Ishikura, Sunao Suzuki and Kazuhiro Kaizaki and assigned to the present assignee, which is a continuation application of U.S. Ser. No. 07/343,495 filed Apr. 25, 1989, now U.S. Pat. No. 5,029,006, the disclosure of which is incorporated herein by reference.

BACKGROUND OF THE INVENTION

The present invention relates to techniques of video signal processing, and more particularly to a method and circuit arrangement for video signal processing suitable for use with a display apparatus which displays an image of a video signal such as a television signal through enlargement and compression to an arbitrary picture size.

At the prevalence of a high-definition television system having an attribute of 16:9 aspect ratio, various studies are under way on the compatibility with the conventional standard television systems such as an NTSC system. Among several problems encountered in displaying a picture of the standard 4:3 aspect ratio on a display unit with a 16:9 aspect ratio, a specific problem is the difference of luminance decay of phosphor due to a side panel signal or side blank panel signal which is applied to the unused sections of the screen.

When the standard video signal of the 4:3 aspect ratio is displayed intact on a display unit with the 16:9 aspect ratio, a circular image turns to a horizontally elongated ellipsoidal image as shown in FIG. 3A, and generally, this impropriety is avoided by compressing the video signal in the horizontal direction as shown in FIG. 3B and displaying the resulting signal with side panel signals being inserted at the rightmost and leftmost sections of the screen as shown in FIG. 3B. However, this method does not use the wide screen area of 16:9 aspect ratio efficiently, i.e., it leaves the partial screen areas unused. In this respect, JP-A-3-11891 offers a method of using the whole screen area by display the standard video signal through the expansion in the vertical direction as shown in FIG. 3C.

FIG. 4A is a conceptual circuit diagram showing the circuit arrangement for carrying out the above-mentioned prior art. In the Figure, a reference numeral 401 denotes an input terminal for the NTSC television signal, 402 denotes an output terminal for the video signal with an attribute of converted aspect ratio, 403 denotes a NTSC decoder which separates the NTSC television signal into a luminance and color difference signal, 404 denotes a non-interlace conversion circuit which converts the signal into double-rated signal for progressive scanning, 405 denotes a first memory circuit used for the time base conversion, 406 denotes a second memory circuit used to determine the extracting position of the video signal, 407 denotes a line calculation circuit which implements the image calculation for an upper and lower lines on the screen, and 408 and 409 denote a first and second selection switching circuits.

In the case of displaying a picture of a 4:3 aspect ratio by inserting the side panel signals in the rightmost and leftmost sections of the screen as shown in FIG. 3B, the first memory circuit 405 is operated by application of a read clock which is higher than the write clock so as to compress the time axis, and the resulting video signal is supplied to the display unit through the a-contact of the second selection switching circuit 409. In the case of displaying a picture represented by a video signal which is derived from a NTSC television signal and conditioned to the 16:9 aspect ratio (the video signal is prerecorded as a "squeezed signal" in which a circular image is reformed in a vertically elongated ellipsoidal image as shown in FIG. 3D), the video signal is fed through intact by way of the a-contact of the first selection switching circuit 408 and the b-contact of the second selection switching circuit 409, instead of using the first and second memory circuits. In this case, the video signal can be displayed to produce a picture of accurate shape on the display screen with a 16:9 aspect ratio as shown in FIG. 3E. In another case of displaying a magnified picture by cutting off its top and bottom sections as shown in FIG. 3C, a second memory circuit 406 having a large storage capacity is used to define the extraction area of picture and the picture is expanded in the vertical direction based on an interpolation process by the line calculation circuit 407.

FIG. 4B shows the arrangement of the line calculation circuit 407. In the Figure, a reference numeral 410 denotes an input terminal for the video signal provided by the second memory circuit 406, 411 denotes an output terminal, 412 denotes a one-line delay memory circuit, 413 and 414 denote coefficient memories used to magnify the image of input signal at a fixed magnification factor, and 415 denotes an adder. The interpolation process implemented by the line calculation circuit 407 will be explained in detail in connection with FIG. 5.

Columns (A) and (B) in FIG. 5 show proper levels and weighting factors or coefficient of scanning lines in magnifying a picture by 4/3 in this example through the interpolation of scanning lines. The video signal for the 4/3 magnification can be produced through a relatively simple filtering process for the factors, as will be appreciated from the Figure. Column (C) in FIG. 5 shows scanning lines on the input terminal 410, i.e., the output of the field memory circuit 406, indicating that the same scanning line is read out once in every four lines. Column (D) in FIG. 5 shows values in the second coefficient multiplier 414 which stores coefficients $\alpha$ to be multiplied to the scanning lines on the input terminal 410. Column (E) in FIG. 5 shows output scanning lines provided by the one-line delay memory 412. Column (F) in FIG. 5 shows coefficients ($1\alpha$) in the first coefficient multiplier 413. Column (G) in FIG. 5 shows output signals of the adder 415. By producing a new scanning line while switching the coefficient for each line, an expanded video signal image a picture having the correct levels shown by (B) in FIG. 5 is obtained. In this manner, the conventional system is devised to display properly an image or picture of a video signal with a 4:3 aspect ratio on a display unit with the 16:9 aspect ratio.

Another prior art disclosed in JP-A-3-60583 uses a deflection circuit for displaying a picture from a video signal of a movie picture size through the vertical expansion thereby to accomplish a display mode of FIG. 3C.

On the other hand, the technique for a display mode shown in FIG. 3B through the compression of input video signal in the horizontal direction is conventionally based on the formation of a read clock from the write clock of the first memory circuit 405 by use of phase locked loop (PLL) circuits. However, such method necessitates multiple PLL circuits within a synchronizing system (sync system) including a PLL circuit for producing the read clock, a PLL circuit for producing the read clock, and an automatic frequency control (AFC) circuit in a CRT deflection circuit, and in displaying pictures from such a video signal source as home VTRs, in which a great deal of jitter is included in the signal, the picture quality is deteriorated due to emphasized jitters caused by the variation of PLL characteristics.

Described above is the prior art method of displaying a picture from a standard video signal of 4:3 aspect ratio with a display unit with a 16:9 aspect ratio. This prior art method is based on the expansion of picture in the vertical direction so that the resulting picture is displayed in the entire screen area of 16:9 aspect ratio. However, it actually involves a problem of possibility in the loss of a crucial portion of a picture. Video signals of movie pictures as shown in FIG. 3F include a variety of sizes of picture field, and when these signals are simply rendered the vertical expansion, the literal field or other crucial section of picture is cut off or a blanking portion at the top or bottom of picture is left unremoved in many cases. Although the above-mentioned prior art of JP-A-3-11891 is devised for the vertical expansion mode to minimize the lost portion at the top and bottom of picture by switching the magnification factor between 4/3 and 5/4 for the first and second coefficient multipliers 413 and 414, it does not consider the horizontal expansion and compression of picture.

Moreover, in the case of displaying a picture from an input video signal by compression as shown in FIG. 3B, it is difficult to prevent the degradation of performance against jitters.

As techniques pertinent to the present invention, there are disclosed video signal processing circuits for enlarging a picture through interpolation for scanning lines by use of a field memory in U.S. Pat. Nos. 4,496,974 and 5,029,006.

SUMMARY OF THE INVENTION

An object of the present invention is to provide an enlarged-picture signal generating circuit arrangement for processing an input video signal to display on a display unit a picture with an aspect ratio different from that of a picture of the input video signal without incurring distortion of image by setting an expansion or compression coefficient optimal for the video signal. Here, the term "enlargement of a picture" is intended to imply "compression of a picture" as well.

Another object of the present invention is to provide a circuit arrangement for implementing compression display for an input picture without incurring the degradation of jitter preventive performance.

Still another object of the present invention is to provide a display system which enables a common screen drive circuit to display with television signals of different television systems.

In order to achieve the above objectives, an enlarged picture generating circuit based on one aspect of the invention comprises first clock generation means for producing a write clock which is synchronous with an input video signal that is adapted to progressive scanning, second clock generation means for producing a read clock having a stable frequency set to about 4/3 times the write clock frequency, memory means for storing temporarily the input video signal in response to the write clock and reading out the stored contents intermittently in response to the read clock, spatial filter means for producing a video signal of an enlarged picture by rendering filtering to the output signal of the memory means, and enlargement control means for controlling the first and second clock generation means, memory means, and spatial filter means.

By making the write clock for the memory means synchronous with the input video signal and setting the read clock frequency to be about 4/3 times the write clock frequency, it becomes possible to render the time-base compression to the video signal. By using a stable read clock which is asynchronous with the input video signal, it becomes possible at the same time to reduce jitters which emerge during the picture enlarging processing. Reading of the video signal out of the memory means is controlled in accordance with the control signals from the enlargement control means in units of line and picture element, and it thereby enables enlarging of a picture as to the video signal in both vertical and horizontal directions. The interval of the halt of reading and the starting position of reading are determined in accordance with the enlarging coefficient or factor and enlarging position which are set in the enlargement control means.

The spatial filter means eliminates distortion of the signal picture which has been enlarged using the memory means. Namely, the spatial filter means has a role of a filter of vertical direction which produces a new scanning line from the current signal and line-delayed signal and a role of a filter of horizontal direction which produces a new picture element from the current signal and picture-element-delayed signal. The spatial filter mean is controlled by the enlargement control means. The video signal of a picture which has been enlarged to the picture size determined by the enlargement control means is now a stable video signal including less jitters, and it can be supplied to display on a display unit with a 16:9 aspect ratio.

BRIEF DESCRIPTION OF THE DRAWINGS

FIG. 1 is a block diagram showing an embodiment of the present invention;

FIGS. 3A to 3F are diagrams showing examples of display of video signals on the display screens with 16:9 aspect ratio and 4:3 aspect ratio;

FIGS. 4A and 4B are block diagrams showing a conventional picture enlarging method;

FIG. 5 is a diagram used to explain the principle of vertical expansion based on the conventional method;

FIG. 8 is a block diagram showing the vertical filter circuit according to the present invention;

FIGS. 9A to 9H are waveform diagrams showing the control method for the horizontal expansion memory according to the present invention;

FIG. 16 is a block diagram showing an example of a factor generation circuit according to the present invention; and FIGS. 17A-17I are diagrams used to explain an inventive scheme of preventing a displayed picture from being disturbed by the fluctuation of clock.

DESCRIPTION OF THE PREFERRED EMBODIMENTS

Figure 2:
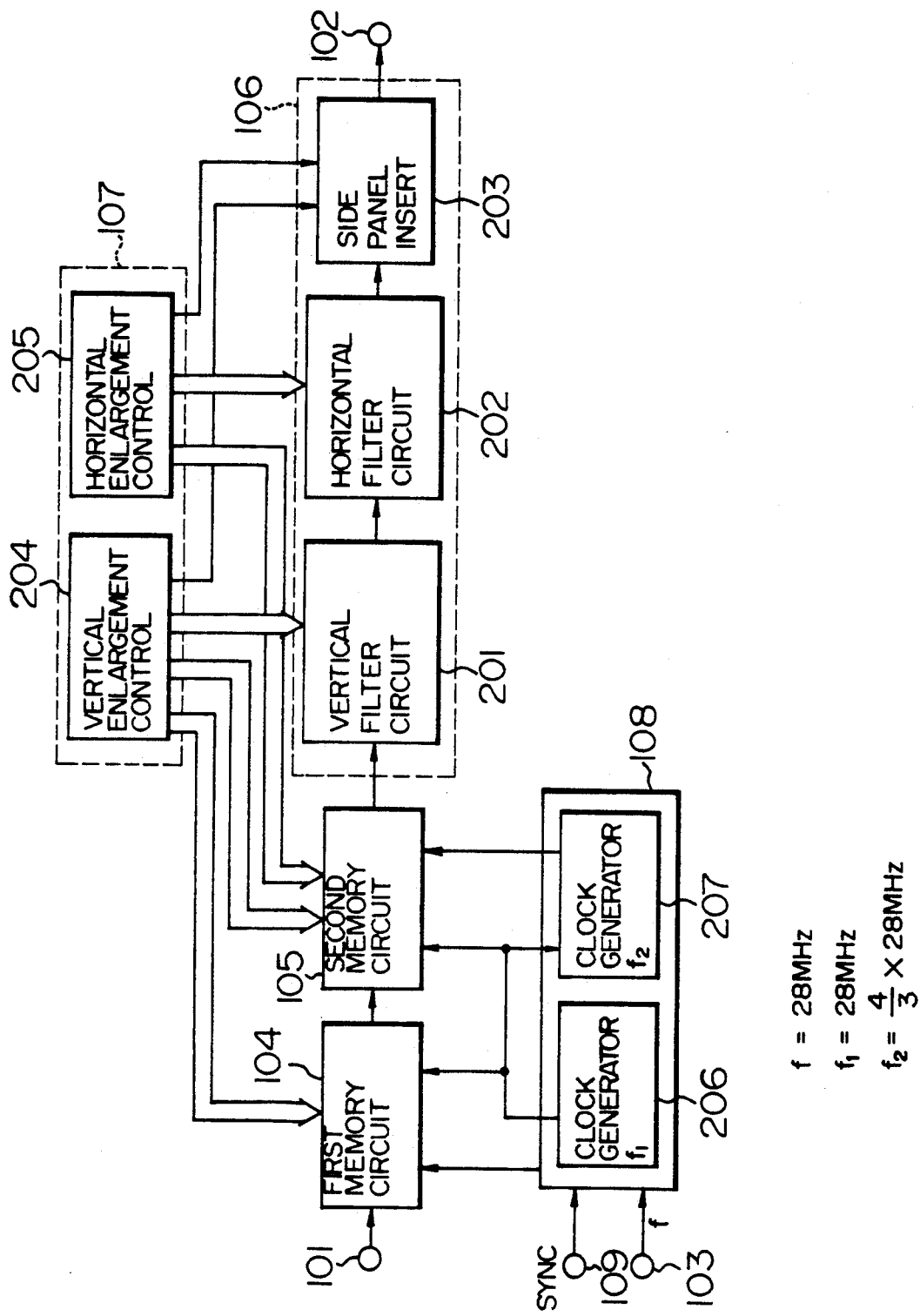
FIG. 2 is a block diagram showing the details of the embodiment.

Embodiments of the present invention will be described in detail with reference to the accompanying drawings.

FIG. 1 shows a display circuit in accordance with an embodiment of the present invention. In the Figure, a reference numeral 101 denotes an input terminal for a video signal which is subject to progressive scanning, 102 denotes an output terminal, 103 denotes an input terminal for a clock signal, 109 denotes an input terminal for a sync signal, 100 is a memory device used for the expanding or enlarging operation for the input video signal, 104 and 105 denote first and second memory circuits which are included in the memory device 100 and operative to write and read data in response to different clocks, 106 denotes a spatial filter circuit which implements the computation of interpolation in the vertical and horizontal directions for the video signal (picture), 107 denotes an expansion or enlargement control circuit which controls the first and second memory circuits and spatial filter circuit, and 108 denotes a synchronizing circuit which supplies clock signals to these circuits. In FIG. 1, the video signal of progressive scanning received on the input terminal 101 is rendered a vertical expansion by the first memory circuit 104 and the horizontal expansion by the second memory circuit 105 through the read/write operation under control of the circuits 107 and 108. Enlargement of picture is carried out by reading out the same line of a frame of video signal more than once for the vertical direction and reading out the same picture element on a line more than once for the horizontal direction. The resulting video signal of the vertically and horizontally expanded picture is subjected to filtering by the spatial filter 106 so that a picture displayed based on the output of the filter 106 appears smooth and natural.

This embodiment shown in FIG. 1 will be explained in more detail with reference to the block diagram of FIG. 2. In the Figure, a reference numeral 201 denotes a vertical filter circuit which produces a new scanning line from two original scanning lines, 202 denotes a horizontal filter circuit which produces a new picture element from two original picture elements, 203 denotes a side panel signal inserting circuit which inserts another video signal, 204 denotes a vertical expansion control circuit which controls the first and second memory circuits 104, 105, vertical filter circuit 201 and side panel signal inserting circuit 203 based on a desired expansion factor, 205 denotes a horizontal expansion control circuit which controls the second memory circuit 105, horizontal filter circuit 202 and side panel signal inserting circuit 203 based on a desired expansion factor, 206 denotes a first clock generation circuit which produces a first clock having a stable frequency which is substantially equal to the frequency of the clock received on the input terminal 103, and 207 denotes a second clock generation circuit which produces a second clock having a frequency which is about 4/3 times that of the first clock and supplies the second clock to the second memory circuit 105. The second clock generation circuit 207 includes a stabilized oscillation frequency source based on a crystal element, for example. The remaining portion is identical to the arrangement shown in FIG. 1.

Figure 6:
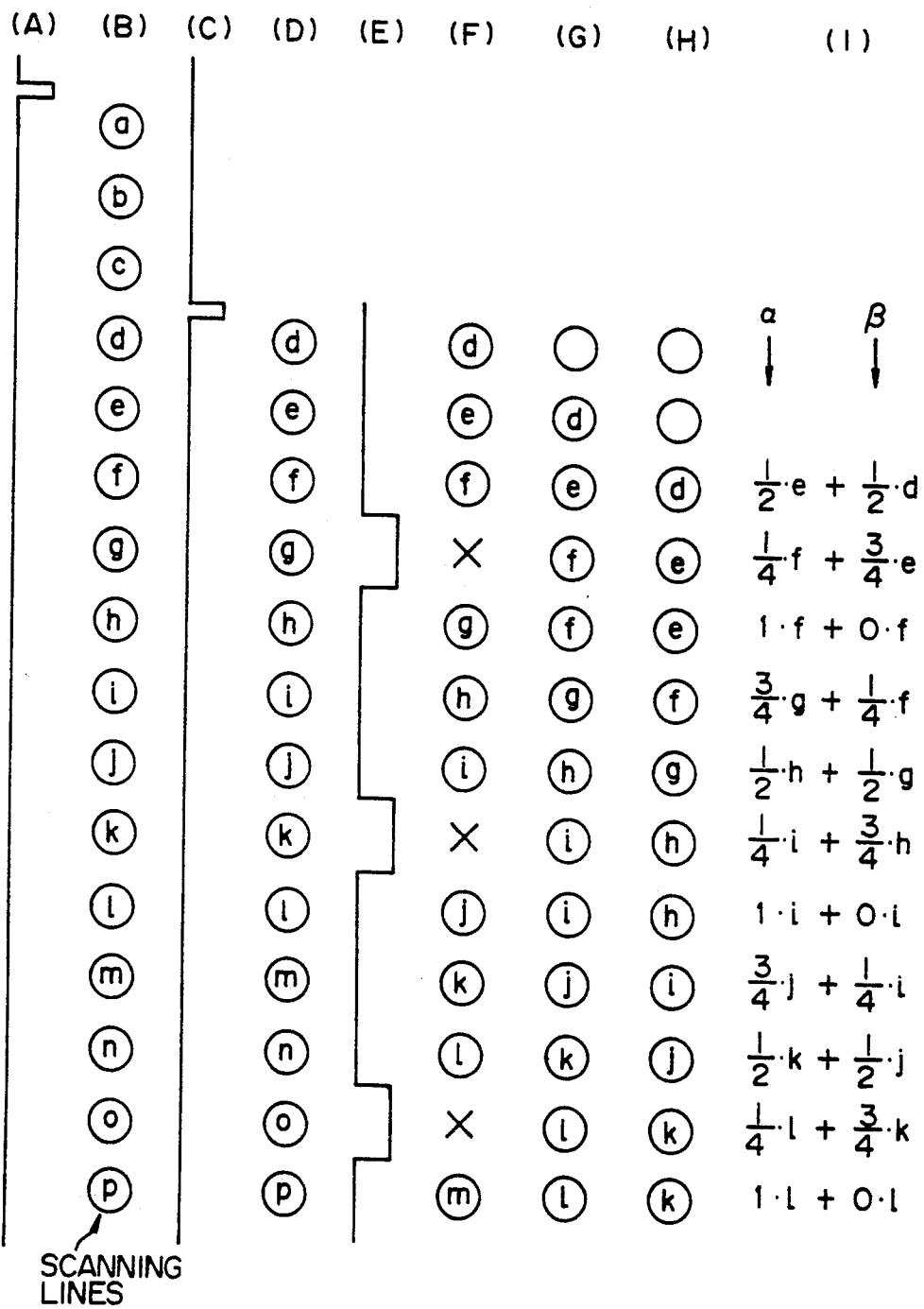
FIG. 6 is a diagram used to explain the principle of vertical expansion according to the present invention.

The following explains the case of enlarging a picture based on the input video signal by 4/3 times, for the sake of simplicity. The first memory circuit 104 serves to determine a vertical range of expansion in a picture corresponding to the input video signal, suspend the memory read-out operation in the period line depending on the expansion coefficient, and convert the video signal which includes gitters into a stable video signal. FIG. 6 shows the principle of expansion in the vertical direction, i.e., expansion of scanning lines. Shown in columns (A) through (F) in FIG. 6 is the operation of the first memory circuit 104. FIG. 6 is assumed a side view of the television screen, with scanning lines being represented by circles labeled by alphabetic characters therein such as ⓐ, ⓓ. Shown by (A) in FIG. 6 is the position of the vertical sync signal in the input video signal. Shown by (B) in FIG. 6 is the positions ⓐ-ⓟ of scanning lines of the video signal received on the input terminal 101. When it is intended to enlarge the picture from an upper bound of scanning line d, the vertical expansion control circuit 204 sets the write reset signal (pulse) for the first memory circuit 104 to the position shown in column (C) in FIG. 6. Accordingly, the write address of the first memory circuit 104 is initialized to zero for the position of scanning line d, and sequential writing of the video signal for enlargement is performed from this position.

Shown by (E) in FIG. 6 is a gate signal for the read clock. During the inactive period of the gate signal, the memory read clock is disabled so that readout of data is suspended for a period of one line. In this example of 4/3 times magnification, a gate-off control signal is applied to the first memory circuit once every four lines. In this manner, the first memory circuit 104 determines the range of expansion and the period of scanning line expansion, and the signal shown by (F) in FIG. 6 is read out of the first memory circuit 104. Symbol "x" in column (F) in FIG. 6 indicates absence of read-out data. Since the first memory circuit 104 operates on the read clock which is derived from the stable first clock produced by the first clock generation circuit 206, the output video signal from the memory does not include gitters.

Figure 7A:
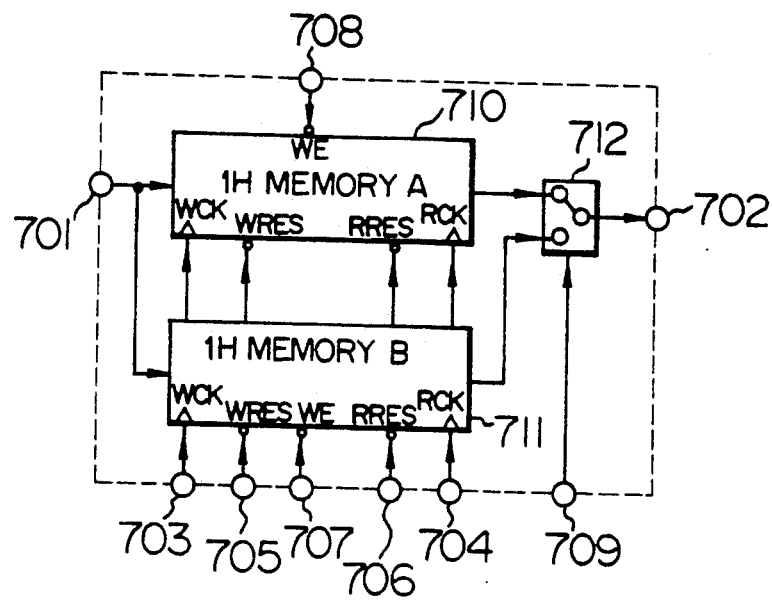
FIG. 7A is a schematic diagram showing an example of the horizontal compression circuit according to the present invention.
Figure 7B:
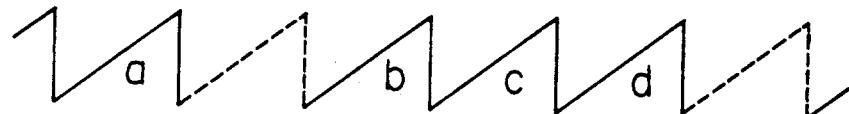
FIGS. 7B to 7I are waveform diagrams showing the operation of the circuit shown in FIG. 7A.
Figure 7C:
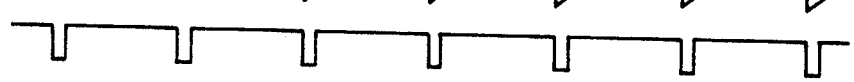
Figure 7D:
Figure 7E:
Figure 7F:
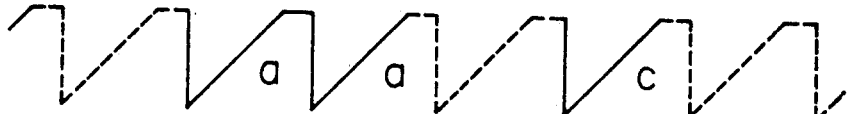
Figure 7G:
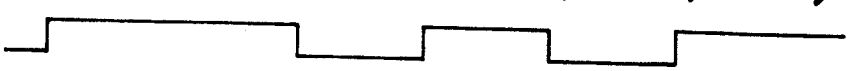
Figure 7H:
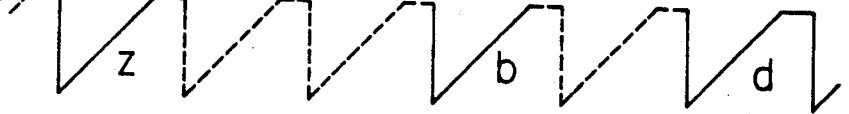
Figure 7I:
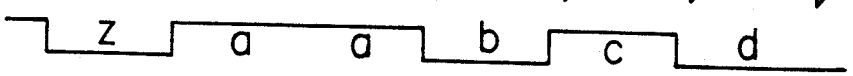

The second memory circuit 105 implements the time-base conversion and reproduction of data during the period while the first memory circuit 104 is suspending the read-out operation. FIG. 7A shows an example of the detailed arrangement of the second memory circuit 105, and FIGS. 7B to 7I show the principle of operation of the circuit. In FIG. 7A, a reference numeral 701 denotes an input terminal for receiving the signal from the first memory circuit 104, 702 denotes an output terminal, 703 denotes an input terminal for receiving the write clock from the first clock generation circuit 206, 704 denotes an input terminal for receiving the read clock from the second clock generation circuit 207, 705 and 706 denote input terminals for the write reset signal and read reset signal, 707 and 708 denote input terminals for the write enable signal, 709 denotes an input terminal for the output control signal, 710 and 711 denote respectively memories each having a one-line capacity, and 712 is a selection switching circuit. The operation of the circuit shown in FIG. 7A will be explained in connection with FIGS. 7B to 7I. FIG. 7B shows an output signal of the first memory circuit 104, in which a waveform of data is absent once every four lines for the implementation of 4/3 magnification. FIG. 7C shows write reset and read reset signals which are received on the input terminals 705 and 706 and used to reset the internal memories 710 and 711. The write address and read address of the memories are reset to address 0 by these signals. FIG. 7D and FIG. 7G show write control signals for the internal memories 710 and 711, which inhibit data from being written to the memories when the input data is absent. FIG. 7E shows an active period of the read clock, which has a frequency about 4/3 times the write clock frequency. The read clock is produced by a PLL circuit in the second clock generation circuit 207. Accordingly, the data is read out in a compressed form, and the data is held during the disable period of the clock. Data read out of the internal memories 710 and 711 includes data pieces which have been read recurrently for the line on which input signal is missing as shown in FIG. 7F and FIG. 7H. The selection switching circuit 712 operates to switch in accordance with an output control signal of FIG. 7I, and the signal which is compressed in the horizontal direction is produced for the scanning lines shown in column (G) of FIG. 6. The internal arrangement of the second memory circuit 105, which has been explained in detail in connection with FIG. 7A, is not limited to this example, but it will be apparent to those skilled in the art that the circuit can be configured with a single line memory by making a displacement in the positional relation of the write reset and read reset signals, for example.

As a result of the foregoing processing, the video signal is compressed in the horizontal direction and the same line is written twice for every three lines for the vertical direction, and thereby an enlarged picture is produced. However, in order to produce a video signal which is expanded smoothly in the vertical direction, filtering in the vertical direction is needed and this is carried out by the vertical filter circuit 201. FIG. 8 shows an example of the detailed arrangement the vertical filter circuit 201.

In FIG. 8, a reference numeral 801 denotes an input terminal for receiving the signal from the second memory circuit 105, 802 denotes an output terminal, 803 denotes an input terminal for producing a combining coefficient depending upon the expansion factor provided by the vertical expansion control circuit 204, 806 denotes an input terminal for supplying a write control signal, 804 denotes a one-line delay memory, and 805 denotes a combining circuit which combines input and output signals of the one-line delay memory. An input signal from the input terminal 801 is shown in column (G) of FIG. 6. The signal shown by (E) of FIG. 6 is used as a write control signal for the one-line delay memory, and it suspends writing once every four lines. Consequently, the output signal of the one-line delay memory 804 is as shown by (H) in FIG. 6. A combining coefficient is produced by the vertical expansion control circuit 204, and in this example of 4/3 magnification, the factor cycles at a 4-line period which is equal to the read suspension period of the first memory circuit 104. By setting factors $\alpha$ and $\beta$ to be multiplied to the input signal and output signal of the one-line delay memory as shown in column (I) of FIG. 6 respectively, with the factors being $\alpha=0$ and $\beta=1$ ($\alpha+\beta=1$) when the input and output signals are equal, a new interpolated scanning line is produced correctly.

The vertical filter circuit 201 has its output signal compressed on the time-base horizontally and filtered in the vertical direction, resulting in a video signal representing a smoothly expanded picture. At this time point, the picture has elongated in the vertical direction. To eliminate this distortion, the video signal needs to be processed such that the corresponding picture is expanded in the horizontal direction by using the second memory circuit 105 and horizontal filter circuit 202. Although the operation of the second memory circuit 105 has been explained on FIG. 7 on assumption that the picture is not expanded horizontally, the following explains the operation in more detail for the case of horizontal expansion.

FIGS. 9A–9H show in a set of waveform diagrams the detailed operation of the second memory circuit 105 when the horizontal expansion takes place. Shown in FIG. 9A is an example of the video signal introduced through the input terminal 701 of FIG. 7A, and the signal consists of a blanking period and a picture period. Shown in FIG. 9B is a write reset signal, and shown by 9C is a write clock. The write clock is produced from the stable first clock provided by the first clock generation circuit. The write clock is variable for its suspension position and period depending on the range (position) of expansion so that the video signal to be expanded as to its picture is stored correctly in the memory. For example, for expanding the signal from a point $a$ of FIG. 9A, the clock is suspended from the blanking end position to the point $a$. Accordingly, when the contents of the memory are read out sequentially in response to this write clock, the signal of the point $a$ is delivered immediately after the blanking period.

FIG. 9E and FIG. 9F show a read reset signal and a read clock, respectively. The read clock is produced from the second clock having a frequency about 4/3 times the write clock which is produced by the second clock generation circuit 207. The read clock is temporarily interrupted by a gate circuit in accordance with the expansion factor. In an example shown in FIG. 9G, one out of four clocks is disabled and the signal is expanded for its specified picture portion as shown in FIG. 9H. This expansion is based on double writing of pixel (picture element) for every several pixels, and it is not a smooth expansion. During the blanking period, the read clock is applied intact, and data of the blanking period is not expanded.

Figure 10A:
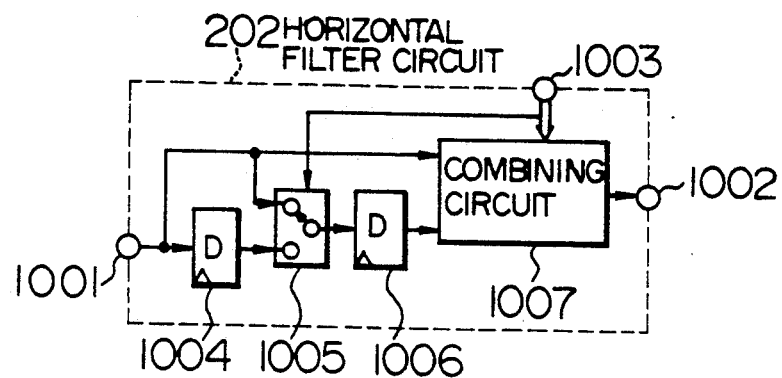
FIG. 10A and FIG. 10B are block diagrams showing examples of the horizontal filter circuit according to the present invention.

The horizontal filter circuit 202 has a role of smoothing the signal, which has been expanded horizontally by the second memory circuit 105, through the filtering period. FIG. 10A shows an example of the detailed arrangement of the horizontal filter circuit 202. In the Figure, a reference numeral 1001 denotes an input terminal for receiving the signal from the vertical filter circuit 201, 1002 denotes an output terminal, 1003 denotes an input terminal for receiving the control signal from the horizontal expansion control circuit 205, 1004 and 1006 denote one-pixel delay circuits (line memories), respectively, 1005 denotes a selector switching circuit, and 1007 denotes a combining circuit which combines a signal from the input terminal 1001 with a signal from the delay circuit 1006 to produce a new pixel signal.

Figures 11A, 11B, 11G:
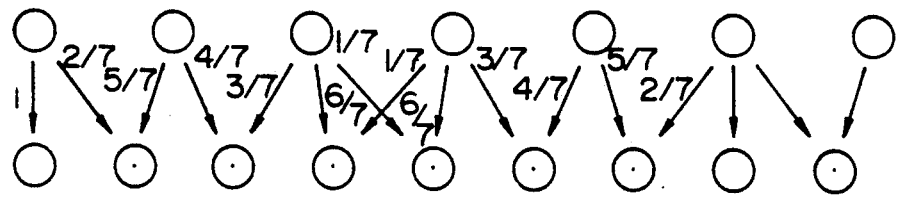
FIGS. 11A to 11K are illustrations used to explain the principle of the horizontal filter according to the present invention.
Figure 11C:
Figure 11D:
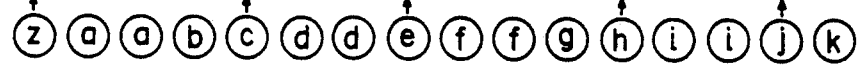
Figure 11E:
Figure 11F:
Figure 11H:

The following explains, with reference to FIGS. 11A to 11K, the operation of the circuit of FIG. 10A by taking another example of vertical expansion by 7/5 which is slightly more difficult than the previous example of 4/3 expansion. In this case, the video signal is stored in the second memory circuit 105 twice for two pixels out of seven pixels, and the signal of increased pixels is applied to the input terminal 1001. FIG. 11C shows an input video signal. Shown by 11A and 11B are the level of original pixels and the level of new pixels before and after the 7/5 expansion. The selector switching circuit 1005 makes switching between the original signal and one-pixel delayed signal in accordance with a control signal shown in FIG. 11E for producing the new interpolated pixels. Shown in FIG. 11F is an output signal of another delay circuit 1006 which delays by one pixel the signal selected by the the selector 1005.

There is a case of existence of two or more new pixels between the original two pixels as shown in FIG. 11A and FIG. 11B, and interpolated pixels of the correct level cannot be obtained through the simple pixel computation based on the original pixels and pixels delayed by one pixel length in this case.

In order to produce interpolated pixels of the correct level, the original signal of FIG. 11C is replaced with a one-pixel-delayed signal shown in FIG. 11D in accordance with the control signal shown in FIG. 11E, for example, so as to produce a new signal shown in FIG. 11F, and the new signal is entered to the combining circuit 1007 thereby to produce interpolated pixels of the correct level shown in FIG. 11G. As a general rule, for an expansion factor M/N (where M and N are natural numbers), if $n \geq M-1 \geq n-1$ (where n is an natural number), there will exist a level of new pixels of n in number between two pixels. Accordingly, in the case of 7/5 expansion there is a case in which two new pixels must be interpolated between the two pixels, and a delay circuit as shown in FIG. 10A is used to obtain correct pixels.

Figure 10B:
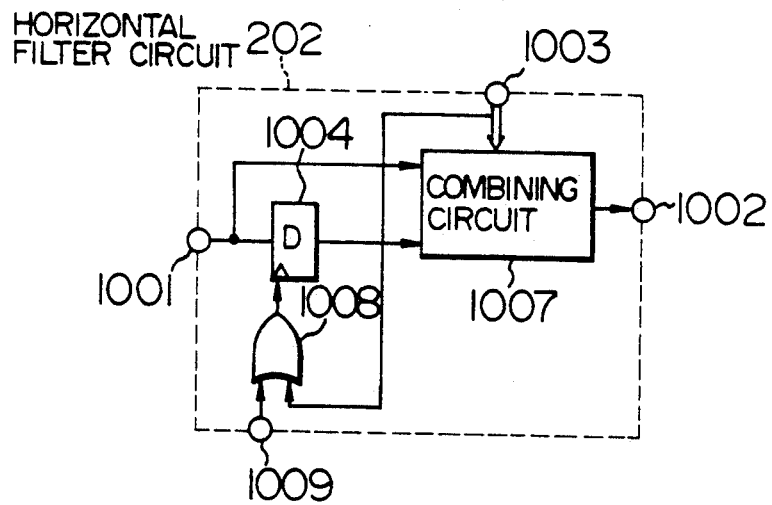
Figure 11I:
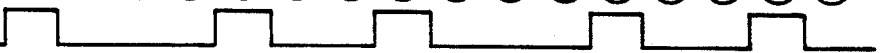
Figure 11J:
Figure 11K:
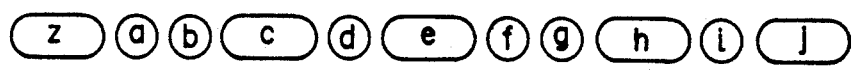

FIG. 10B shows another example of the detailed arrangement of the horizontal filter circuit 202. In the Figure, a reference numeral 1008 denotes a gate circuit, 1009 is an input terminal for the clock, and remaining portions are the same as the previous example of FIG. 10A. In FIG. 10B, the gate circuit 1008 interrupts the clock from the input terminal 1009 in accordance with the control signal from the input terminal 1003 thereby to hold pixels. The operation is equivalent to that of the circuit shown in FIG. 10A. FIG. 11I shows a gate signal which disables or suspends the clock, and FIG. 11J shows a gated clock, and FIG. 11K shows an output signal of the delay circuit 1004. By entering the output of FIG. 11K to the combining circuit 1007, interpolated pixels of correct level can be produced. The circuit arrangement of FIG. 10B is capable of dealing with the case of n equal to or greater than two based on the control signal from the input terminal 1003, and accordingly it allows horizontal expansion of arbitrary factor.

The arrangement of the horizontal filter 202 is not limited to the foregoing example, but it will be appreciated for those skilled in the art that the horizontal filter can basically be served by any circuit arrangement which produces a delay time to meet the clock suspension and a combined output in compliance with the expansion factor.

The foregoing explanation has been made of examples of 4/3 vertical expansion and 7/5 horizontal expansion. The following explains in detail the arrangement of the combining circuit and expansion control circuit for accomplishing arbitrary expansion factors. Table 1 is a list of factors of the combining circuit for accomplishing the vertical expansion by one to two fold, and Table 2 shows the 8-bit approximation.

TABLE 1

| Expansion factor | | $a_0$ | $a_1$ | $a_2$ | $a_3$ | $a_4$ | $a_5$ | $a_6$ | $a_7$ | $a_8$ |
|---|---|---|---|---|---|---|---|---|---|---|
| 1 | 1.0 | 0 | — | — | — | — | — | — | — | — |
| 7/6 | 1.17 | 0 | 1/7 | 2/7 | 3/7 | 4/7 | 5/7 | 6/7 | — | — |
| 5/4 | 1.25 | 0 | 1/5 | 2/5 | 3/5 | 4/5 | — | — | — | — |
| 4/3 | 1.33 | 0 | 1/4 | 2/4 | 3/4 | — | — | — | — | — |
| 7/5 | 1.4 | 0 | 2/7 | 4/7 | 6/7 | 1/7 | 3/7 | 5/7 | — | — |
| 3/2 | 1.5 | 0 | 1/3 | 2/3 | — | — | — | — | — | — |
| 5/3 | 1.67 | 0 | 2/5 | 4/5 | 1/5 | 3/5 | — | — | — | — |
| 7/4 | 1.75 | 0 | 3/7 | 6/7 | 2/7 | 5/7 | 1/7 | 4/7 | — | — |
| 9/5 | 1.8 | 0 | 4/9 | 8/9 | 3/9 | 7/9 | 2/9 | 6/9 | 1/9 | 5/9 |
| 2 | 2.0 | 0 | 1/2 | — | — | — | — | — | — | — |

TABLE 2

| Expansion factor | | 1024 × $a_0$ | 1024 × $a_1$ | 1024 × $a_2$ | 1024 × $a_3$ | 1024 × $a_4$ | 1024 × $a_5$ | 1024 × $a_6$ | 1024 × $a_7$ | 1024 × $a_8$ |
|---|---|---|---|---|---|---|---|---|---|---|
| 1 | 1.0 | 0 | — | — | — | — | — | — | — | — |
| $\frac{1024}{878}$ | 1.17 | 0 | 146 | 292 | 438 | 584 | 730 | 876 | — | — |
| $\frac{1024}{819}$ | 1.25 | 0 | 205 | 410 | 615 | 820 | — | — | — | — |
| $\frac{1024}{768}$ | 1.33 | 0 | 256 | 512 | 768 | — | — | — | — | — |

TABLE 2-continued

| Expansion factor | | 1024 × $a_0$ | 1024 × $a_1$ | 1024 × $a_2$ | 1024 × $a_3$ | 1024 × $a_4$ | 1024 × $a_5$ | 1024 × $a_6$ | 1024 × $a_7$ | 1024 × $a_8$ |
|---|---|---|---|---|---|---|---|---|---|---|
| $\frac{1024}{730}$ | 1.4 | 0 | 294 | 588 | 882 | 152 | 446 | 740 | — | — |
| $\frac{1024}{682}$ | 1.5 | 0 | 342 | 684 | — | — | — | — | — | — |
| $\frac{1024}{615}$ | 1.67 | 0 | 409 | 818 | 203 | 612 | — | — | — | — |
| $\frac{1024}{584}$ | 1.75 | 0 | 440 | 880 | 296 | 736 | 152 | 592 | — | — |
| $\frac{1024}{570}$ | 1.8 | 0 | 454 | 908 | 338 | 792 | 222 | 676 | 106 | 560 |
| 2 | 2.0 | 0 | 512 | — | — | — | — | — | — | — |

For example, when the expansion factor is defined to be M/N (where N is a natural number smaller than or equal to 8, and M is a natural number smaller than or equal to 15), there are 23 possible expansion factors which can be set. Table 1 shows ten factors among them. When the control signals α and β of the combining circuit 805 are 8-bit signals for example, α(1) through α(15) have values shown in Table 1 based on the approximation of the expansion factor as M/N≃256/L (0≦L≦≦255, L is an integer). Table 2 shows the approximated expansion factors and values of α(n) which can be expressed by eight bits. The period of α(n) is given by M, and the value of α(n) is expressed by the following Expression (1).

$$\begin{aligned}\alpha(0) &= 0 \\ \alpha(1) &= (256-L)/256 \\ \alpha(n) &= f\{\alpha(n-1)+\alpha(1)\}\end{aligned} \quad (1)$$

where f(x) is a function taking the decimal part of x, and n is an integer in the range of 0≦n≦M−1.

By synchronizing the combining coefficient expressed by Expression (1) with the control of the memory circuits 104 and 105, control of 23 combinations is made possible. In the case of displaying a movie picture by magnification with a display unit having a wide display screen, it is sufficient to prepare magnification factors up to two fold and combining coefficients from four bits to eight bits. By increasing the values of the constants M and N and the number of bits of combining coefficient, arbitrary magnification factors can be set.

Figure 15A:
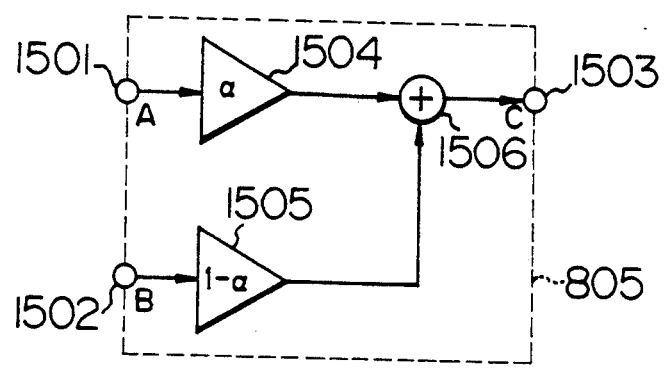
FIG. 15A and FIG. 15B are block diagrams showing examples of a combining circuit according to the present invention.
Figure 15B:
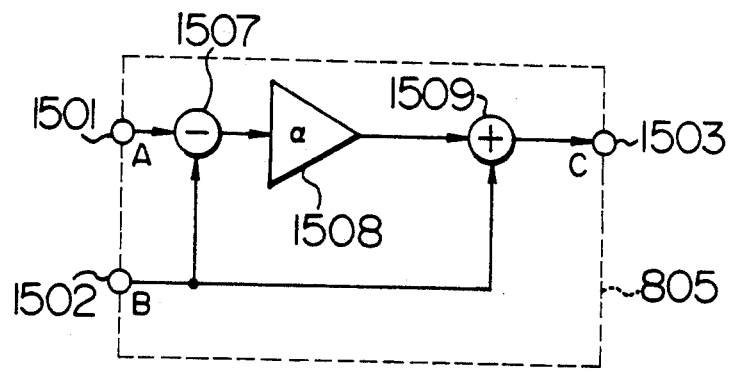

Examples of the combining circuit 805 and combining coefficient generation circuit will be explained in connection with FIG. 15A, FIG. 15B and FIG. 16. In FIGS. 15A and 15B, reference numerals 1501 and 1502 denote input terminals of the combining circuit 805, 1503 denotes an output terminal, 1504, 1505 and 1508 denote first, second and third factor multipliers, 1506 and 1509 denote first and second adders, and 1507 denotes a subtracter. The combining circuit shown in FIG. 15A receives signals A and B on the input terminals 1501 and 1502, and delivers a combined output C which is expressed by the following Expression (2). Similarly, the combining circuit shown in FIG. 15B delivers a combined output which is expressed by Expression (3).

$$C = \alpha A + (1-\alpha)B \ldots \quad (2)$$

$$C = \alpha(A-B)+B \ldots \quad (3)$$

The combining circuit 805 shown in FIG. 15A and FIG. 15B can be arranged relatively simply by determining the combining coefficient α.

FIG. 16 shows a factor generation circuit which produces the combining coefficient α. In the Figure, a numeral 1601 denotes an input terminal for the reset signal, 1602 denotes an input terminal for clock which is used to update the combining coefficient α, 1603 denotes an output terminal for the control signal which controls writing and reading of the first and second memory circuits 104 and 105, 1604 denotes an output terminal for the combining coefficient α, 1605 denotes an expansion factor setting circuit which determines the constant L depending on the magnification factor M/N, 1606 denotes a divide-by-M counter, 1607 denotes an adder, and 1608 denotes a latch circuit. Once the value of M/N is determined, the expansion factor setting circuit 1605 evaluates the value of L of 256/L which is close to M/N, calculates the value of K which is equal to (256−L)256, and delivers the result to the adder 1607. The clock received on the input terminal 1602 is a clock having a one-line period in the case of vertical expansion, or it is a pixel-wise clock in the case of horizontal expansion. The adder 1607 has its output latched in the latch circuit 1608 so that the latched value is updated, and it is delivered as a combining coefficient α. The combining coefficient α is initialized cyclically at an interval of M by the counter 1606. Shown in FIG. 16 is an example of the circuit which sets the combining coefficient α and control timing of memory, and this circuit is capable of setting the values of α(n) shown in Table 1 and the system which can select the expansion factor arbitrarily can be configured by use of the circuit.

In the foregoing embodiments, vertical expansion by the first memory 103 and time-base compression and horizontal expansion by the second memory 104 can be controlled independently, and accordingly the distortion of the input video signal can be corrected. Specifically, by providing an increased horizontal expansion factor after time-base compression for a standard television signal (NTSC, etc.) which has been converted from the high-definition television signal, e.g., an input signal shown in FIG. 3D, it is possible to restore the correct signal waveform as shown in FIG. 3E. The converted standard television signal, which is derived from a high-definition television signal, is displayed without distortion on a wide display screen with the 16:9 aspect ratio.

Elimination of the distortion caused by the frequency conversion at the television system converting process and correction of horizontal 12/11 expansion, which need to be done inherently in the high-definition television receiver, are carried out at a time according to this embodiment, and consequently the circuit is simplified and a displayed picture without distortion can be offered.

In addition, even in the case of a display unit having a 4:3 aspect ratio, it is possible to correct the distortion of signal attributable to the difference of aspect ratio by adjusting the expansion factors of the input video signal for the vertical direction and horizontal direction independently from each other.

Figure 12:
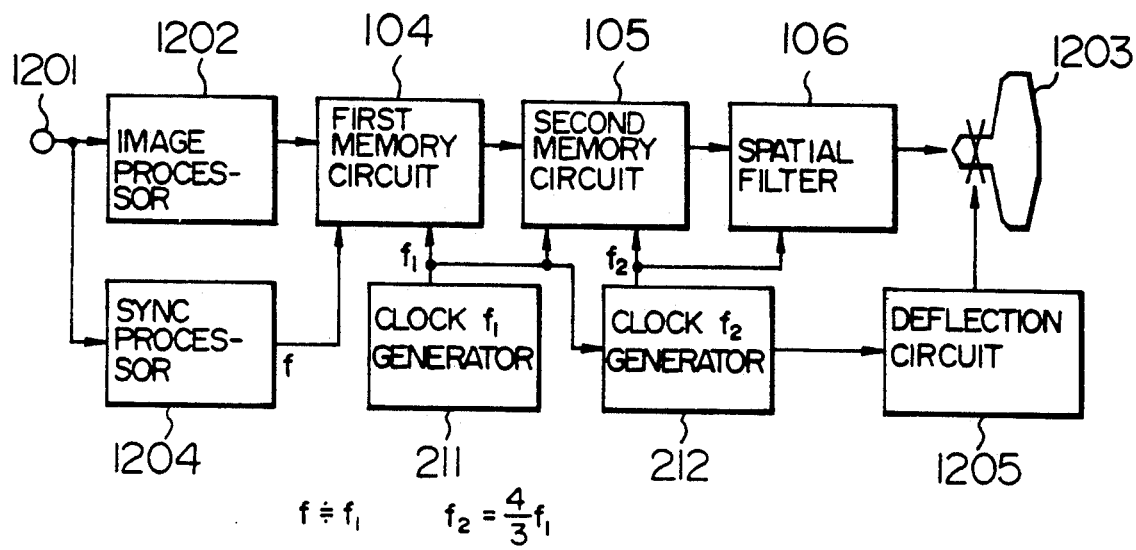
FIG. 12 is a block diagram of the present invention in which a sync circuit is included.

Next, stabilization of the video signal, which is another object of the present invention, will be explained with reference to FIG. 12. In the Figure, symbol a numeral 1201 denotes an input terminal for a video signal, 1202 denotes an image processing circuit which converts the input video signal into a digital signal in the form of progressive scanning, 1203 denotes a display unit such as a CRT, 1204 denotes a sync processing circuit including a PLL circuit for implementing a sync processing for the input video signal, 1205 denotes a deflection circuit which drives a display unit, and remaining portions are identical to the preceding embodiment of FIG. 1 and FIG. 2. In clock generation for the conventional digital television receiver, the synchronizing circuit 1204 for producing a write clock for the first memory circuit 104, a second clock generation circuit 212 for producing a read clock for the second memory circuit 105 and a deflection circuit for producing a sync signal of the display unit 1203 include three PLL systems, respectively. When these PLL circuits are cascade-connected, a large jitter, if exist in the input signal, is displayed by being emphasized due to the response time lag of these PLL circuits. According to the present invention, as shown in FIG. 12, the first clock generation circuit 211 is formed of an independent clock generation circuit using a crystal oscillator or the like, which enables the generation of a stable clock, and therefore, it does not propagate the jitter to the succeeding-stage circuit having two PLL systems. Namely, the read/write clock for the memory other than the write clock of the memory for the input video signal which has been converted into a digital signal in this system is stabilized as mentioned above, and consequently the amount of jitter created initially by the sync processing circuit 1204 does not increase.

Figure 13:
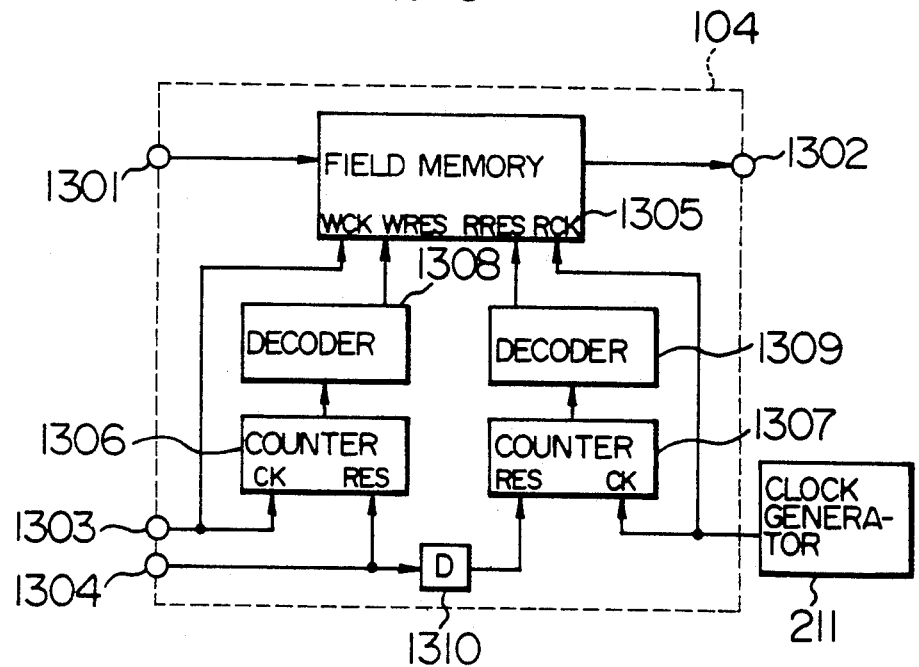
FIG. 13 is a block diagram showing the control method for the field memory according to the present invention.

The clock generation circuit 211 in FIG. 12 is an oscillation circuit including a crystal oscillator or the like for producing a stable clock at 28.63 MHz which is eight times the 3.58 MHz color subcarrier frequency for example, and it is close to but asynchronous with the frequency of the clock produced by the sync processing circuit 1204. Accordingly, if it is a simple independent clock, the signal read out of the first memory circuit 103 will deviate progressively from the input video signal, and when the deviation grows as much as the memory capacity, the continuity of video signal will be lost. FIG. 13 shows an example of the arrangement of the memory circuit 104 and its peripheral circuitry for preventing this problem. In the Figure, a numeral 1301 denotes an input terminal for the video signal, 1302 denotes an output terminal, 1303 and 1304 denote vertical sync signal and clock supplied by the sync processing circuit 1204, 1305 denotes a field memory, 1306 and 1307 denote counters, 1308 and 1309 denote decoders, 1310 denotes a delay circuit, and remaining portions are identical to the arrangement of FIG. 2.

In FIG. 13, a write clock for the field memory 1305 is a clock which is received on the input terminal 1303 and synchronous with the video signal, and at the same time, the write clock is a clock for the counter 1306. The read clock for the field memory 1305 is the stable clock produced by the clock generation circuit 211, and it is also supplied to the counter 1307. The counters 1306 and 1307 have their count values decoded by the decoders 1308 and 1309, and the decoded results become the write reset and read reset signals for the field memory 1305. A general video signal including a large jitter deviates from the stable clock as much as two lines in a field at most. Accordingly, by using a memory with a large capacity as of the field memory and using a delay circuit 1310 or the like for the write reset and read reset signals thereby to provide a time difference of two lines or more, it is possible to bring the discontinuous point of the video signal to the vertical flyback period on vertical blanking period. The detailed description will be given later in connection with FIG. 17. In the embodiment of FIG. 13, the counter 1306 for writing and counter 1307 for reading are reset through the rendition of a delay as much as several lines while retaining the phase relation of the vertical sync signal received on the input terminal 1304, and therefore the problem of memory caused by the difference in frequency between the write clock and read clock can be eliminated.

However, in the method shown in FIG. 13, the counter 1307 for reading is reset independently of the clock of reading supplied by the clock generation circuit 211, and the horizontal sync signal for display produced by decoding the count value of the counter 1307 does not maintain the periodicity at the time of resetting. That is, it is necessary to improve the response or follow-up capability of the deflection circuit in the display unit to the horizontal sync signal so that the video signal does not fall disordered.

In this manner, the circuit arrangements shown in FIG. 12 and FIG. 13 are capable of producing a video signal of high-quality picture even for an input signal containing much jitters.

Figure 17I:
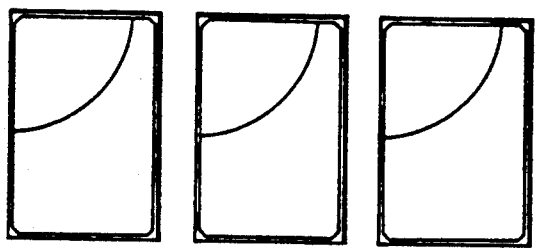

In addition, the arrangement of this embodiment provides the following specific effect as well. FIGS. 17A to 17I are illustrations for providing two-fold enlargement of a picture portion in a bottom left zone on a screen. FIG. 17A shows an input vertical sync signal, and FIG. 17C shows an input picture. FIG. 17B shows a disorder of clock caused by the sync signal. FIGS. 17D, 17E and 17F show results of expansion in accordance with the conventional method, in which FIG. 17D indicates an output vertical sync signal, FIG. 17E indicates the disordered clock, and FIG. 17F indicates an output picture. Because of a single clock system, the clock shown in FIG. 17F has the same disorderliness as that of FIG. 17B. On this account, the expanded video signal causes the resulting picture to distort at the vertical position corresponding to the disorderly clock portion. In order to eliminate this defect, the conventional method needs to use a memory of one field or more specialized for this purpose.

Figure 17H:
Figure 17G:

The expansion based on the inventive signal processing is shown in FIGS. 17G, 17H and 17I. FIG. 17G shows an output vertical sync signal, 17H shows an ordered clock, and FIG. 17I shows an output picture. The inventive method reads out the video signal from the temporary memory in response to the stable clock shown in FIG. 17H, and consequently the disorderliness of video signal caused by the input sync signal shown in FIG. 17A is eliminated and the video signal is rid of disorderliness in the entire magnified or enlarged picture area.

In the above explanation, it is assumed that the clock frequency of the clock generation circuit 211 is very close to the clock frequency of the sync processing circuit 1204. The crystal oscillator produces a frequency of 28.63636 MHz which is eight times the color subcarrier frequency fsc=3.579545. When the stable clock oscillation frequency of the first clock generation circuit 211 is set to be 8fsc, the line frequency automatically becomes about 31.5 kHz which is the double-rated horizontal frequency of NTSC system. A television system of a wide display screen is intended for the prevalence of the high-definition television, and therefore it must be compatible with the high-definition television system. For providing the performance of displaying the high-definition television picture, the display unit is designed to operate in two modes at a horizontal deflection frequency of 31.5 kHz for the double-rated NTSC system and of 33.75 kHz for the high-definition television system so that it is compatible with the input signal of the high-definition system. With the stable clock frequency for the first clock generation circuit 211 being set to about 30.7125 MHz, the horizontal frequency which meets 910 pixels is about 33.75 kHz which coincides with the horizontal frequency of high-definition television, and therefore, it is no more necessary to design the deflection system operating in two modes. In this case, the first memory circuit 104 has a faster read clock relative to the write clock, and a memory capacity of at least 40 lines will be required. In the case of conducting the conversion of horizontal scanning frequency, the number of scanning lines increases from 525 to about 562. This is equivalent to the reduction in the interval of scanning lines and the displayed picture is compressed in the vertical direction. The degree of this distortion is 525/562.5≈0.93. Accordingly, if it is intended to drive the display unit always at the horizontal sync frequency of high-definition television, the video signal is expanded by 562.5/525 in the vertical direction based on the foregoing technique. For example, through the vertical expansion by about 16/15, it becomes possible to display a video signal without distortion on a display unit of high-definition television. Accordingly, the deflection circuit can be designed to meet a single frequency, while retaining the inherent performance, whereby the convergence circuit and high-voltage circuit can be simplified and the cost of the system can be lowered.

According to this embodiment, as described above, an input video signal with the 4:3 aspect ratio is rendered the temporary time-base compression by the second memory circuit 105 and thereafter, it is expanded at an arbitrary expansion factor.

In addition, according to this embodiment, the vertical filter circuit 201 and horizontal filter circuit 202 can operate independently and the vertical expansion control circuit 209 and horizontal expansion control circuit 210 can operate independently, and therefore the expansion factors can be determined independently for the vertical direction and horizontal direction.

In addition, in this embodiment, the video signal in term of a picture is expanded after it has been compressed on the time-base in the horizontal direction by the second memory circuit 105. In case the time-base compression is not carried out prior to the horizontal expansion, it is necessary to have a horizontal reduction when the expansion factor is 4/3 or smaller or otherwise have a horizontal expansion. Since the signal is always expanded in the vertical direction in this case, a complex control circuit is needed. In contrast, when the time-base compression takes place prior to the expansion, as is the case of this embodiment, the horizontal expansion is controlled by the same control circuit irrespective of the expansion factor, and the system can be simplified.

Figure 14:
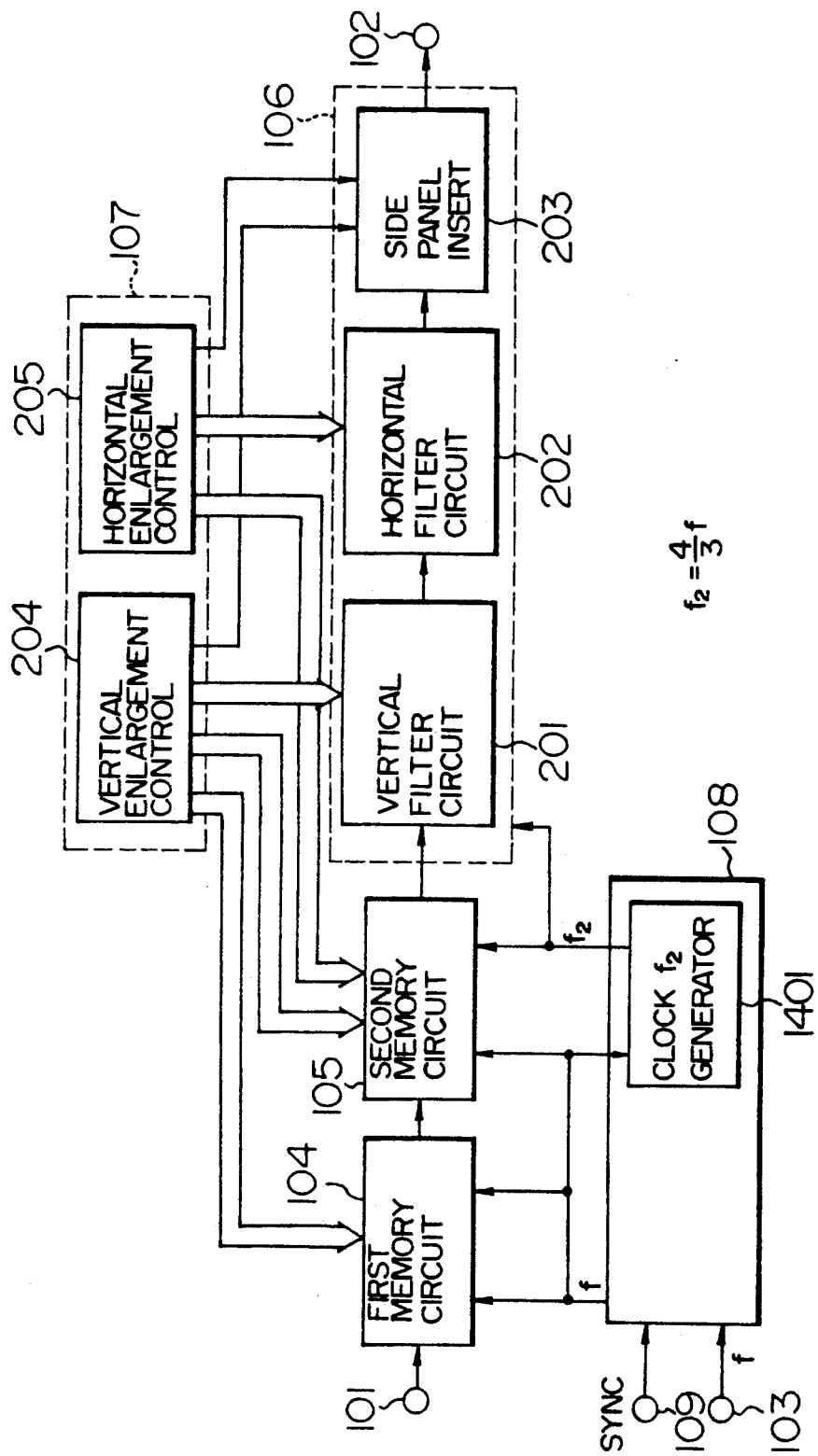
FIG. 14 is a block diagram showing another embodiment of the present invention.

FIG. 14 shows another embodiment of the present invention. All functional blocks in the Figure are identical to those of the preceding embodiment of FIG. 2. In the embodiment of FIG. 2, the first memory circuit 104 operates on the write clock and read clock which are different, and particularly it uses a stable clock for reading. However, when the write clock and read clock are different, it is necessary to correct the deviation between the write and read clocks through the forced resetting, as has been explained in the previous embodiment. This operation creates a discontinuity in the sync signal, which could develop a blurred picture. This embodiment prevents the discontinuity of sync circuit by using the same clock for writing and reading for the first memory 104. The clock generation circuit 1401 produces a clock having a frequency about 4/3 times the one produced with a PLL circuit from the first clock, and no discontinuity occurs in the sync signal. According to this embodiment, an expanded video signal without sync disorder can be displayed on a display unit with the 16:9 aspect ratio.

According to the invention, a video signal of a 4:3 aspect ratio picture is provided to display on a display unit with a 16:9 aspect ratio through expansion or compression signal processings which meet the feature of the video signal, whereby the display screen with the 16:9 aspect ratio can be used efficiently. Through the clock stabilization, it becomes possible to deliver a video signal including less jitters. Based on the independent control of the expansion factor for the horizontal direction and that for the vertical direction, the inventive circuit arrangement can be applied to display units with a 4:3 aspect ratio and also to video signals which include a distortion from the beginning.

What is claimed is:

1. A video signal processing circuit for processing an input quantized video signal subjected to progressive scanning with a synchronizing (sync) signal to provide a video signal representing an enlarged image comprising: memory means for reading and writing said input quantized video signal in response to a clock; sync processing means for supplying to said memory means a sync signal, to read out a quantized video signal written in said memory means in response to a read clock having a frequency about 4/3 times a write clock for said input quantized video signal; spatial filter means for performing a filtering of the read-out video signal from said memory means; and enlargement control means for controlling said memory means and said spatial filter means to read out the quantized video signal from said memory means intermittently to produce a new video signal indicative of an enlarged image.

2. A video signal processing circuit according to claim 1, wherein said video signal of progressive sequential scanning is a signal which is derived from a high-definition television signal, converted into a standard television signal and thereafter formed into a progressive scanning signal.

3. A video signal processing circuit according to claim 1, wherein said memory means includes first and second memory means, and said sync processing means includes first clock generation means for producing a first clock which is synchronous with the input video signal, second clock generation means for producing a stable second clock having a frequency substantially equal to the first clock frequency, third clock generation means for producing a third clock, which has a frequency about 4/3 times the second frequency, from the second clock, and means for supplying the first clock as a write clock to said first memory means, the second clock as a read clock to said first memory means, the second clock as a write clock to said second memory means, and the third clock as a read clock to said second memory means, said circuit providing a video signal indicative of an enlarged image including less jitters.

4. A video signal processing circuit according to claim 3, wherein said third clock generation means includes a stable clock generator which produces a stable clock having a frequency about ¾ times the frequency of the first clock, and means for supplying the first clock as a write and read clock to said first memory means, the first clock as a write clock to said second memory means and the third clock as a read clock to said second memory means, said circuit providing a video signal of magnified picture including less jitters.

5. A video signal processing circuit according to claim 3, wherein said third clock generation means produces a clock based on a frequency substantially equal to the horizontal sync frequency of a high-definition television system so that said circuit can display a video signal on a display unit of the high-definition television system.

6. A video signal processing circuit according to claim 4, wherein said third clock generation means produces a clock based on a frequency which is substantially equal to the horizontal sync frequency of a high-definition television system so that said circuit can display a video signal on a display unit of the high-definition television system.

7. A video signal processing circuit according to claim 1, wherein said spatial filter means includes first delay means for delaying the output signal of said memory means, said memory means being capable of reading and suspending the reading of a video signal, which has been stored temporarily, in a predetermined period, selection switching means for switching an input signal and an output signal of said first delay means, second delay means for delaying an output signal of said selection switching means, and combining means for combining the output signal of said memory means with the output signal of said second delay means.

8. A video signal processing circuit according to claim 1, wherein said spatial filter means includes delay means for delaying the output signal of said memory means, said memory means being capable of reading and suspending the reading of a video signal, which has been stored temporarily, gate means for interrupting the supply of the clock to said delay means, and combining means for combining the output signal of said memory means with an output signal of said delay means.

9. A video signal processing circuit according to claim 1, wherein said memory means includes first memory means capable of reading and suspending the reading of a video signal, which has been stored temporarily, in a predetermined line period, and second memory means capable of writing and suspending writing of the output signal of said first memory means in the line period, and said spatial filter means includes a third memory means capable of writing and suspending the writing of the output signal of said second memory means in a line period, and combining means for combining input and output signals of said third memory means.

10. A video signal processing circuit for receiving an input video signal subjected to progressive scanning, storing the video signal in a memory and processing the video signal to provide a new video signal indicative of an enlarged image, comprising: clock generation means for producing a stable read clock for said memory having a frequency higher than a writing frequency of the input video signal to said memory; enlargement control means for reading the stored video signal out of said memory intermittently by controlling application of the memory read clock in accordance with a magnification factor of image as to the input video signal; and spatial filter means for implementing a filtering processing for the video signal which is read out of said memory in response to a control output of said enlargement control means thereby to produce the new video signal to be displayed.

11. A video signal processing circuit according to claim 10, wherein an aspect ratio of the image of the input video signal is 4/3 an the aspect ratio of the magnified image is 16/9.

12. A video signal processing circuit according to claim 10, wherein said clock means includes a clock source of a stable frequency provided independently of the clock source used to store the input video signal in said memory.

13. A video signal processing circuit according to claim 10, wherein said memory has a first memory area used for an expansion/compression processing for the input video signal in the vertical direction of image and a second memory area for an expansion/compression processing in the horizontal direction of the image.

14. In a video signal processing circuit capable of enlarging and displaying an image and adapted to store an input quantized video signal in a memory in a predetermined period, and read the video signal out of said memory in a period different from the period of storing so that the image of the video signal is enlarged to display an enlarged image of the video signal, a method of producing a video signal representing the enlarged image comprising the steps of:
  storing an input video signal subjected to progressive scanning in said memory in accordance with a first clock which is produced from an input synchronizing (sync) signal;
  producing a stable read clock having a frequency higher than a write clock frequency by about a magnification factor of an aspect ratio;
  controlling a read operation of said memory using said produced read clock so that the stored video signal is read out of said memory intermittently in accordance with the produced read clock; and
  performing a filtering of the read-out video signal in the vertical and horizontal directions of image represented by said read-out video signal thereby to produce a video signal indicative of an enlarged image to be displayed.

15. A video signal processing method according to claim 14, comprising configuring said memory to include a first memory used to expand the input video signal in the vertical direction of the image of the video signal and a second memory used to implement time-base compression for the output signal of said first memory in the horizontal direction of the image and thereafter expansion for the compressed signal; producing a first clock synchronous with the input video signal; producing a stable second clock having a frequency substantially equal to the frequency of the first clock; producing, from the second clock third, a clock having a frequency about 4/3 times the frequency of the second clock; and using the first clock as a write clock for said first memory, the second clock as a read clock for said first first memory, the second clock as a write clock for said second memory, and the third clock as a read clock for said second memory, respectively.

* * * * *